(12) United States Patent
Li et al.

(10) Patent No.: US 12,729,153 B2

(45) Date of Patent: Sep. 8, 2026

(54) TRANSPARENT SUBSTRATES COMPRISING THREE-DIMENSIONAL POROUS CONDUCTIVE GRAPHENE FILMS AND METHODS FOR MAKING THE SAME

(71) Applicants: CORNING INCORPORATED, Corning, NY (US); ICFO—The Institute of Photonic Science, Barcelona (ES); Institució Catalana de Recerca i Estudis Avançats (ICREA), Barcelona (ES)

(72) Inventors: Connie Li, Painted Post, NY (US); Xinyuan Liu, San Jose, CA (US); Miriam Marchena Martin-Francés, Barcelona (ES); Valerio Pruneri, Castelldefels (ES); Wageesha Senaratne, Horseheads, NY (US); Zhen Song, Painted Post, NY (US); Kamal Kishore Soni, Painted Post, NY (US)

(73) Assignees: Corning Incorporated, Corning, NY (US); ICFO—The Institute of Photonic Science, Barcelona (ES); Institució Catalana de Recerca i Estudis Avançats (ICREA), Barcelona (ES)

( * ) Notice: Subject to any disclaimer, the term of this patent is extended or adjusted under 35 U.S.C. 154(b) by 127 days.

(21) Appl. No.: 18/081,790

(22) Filed: Dec. 15, 2022

(65) Prior Publication Data

US 2023/0219840 A1 Jul. 13, 2023

Related U.S. Application Data

(62) Division of application No. 17/359,739, filed on Jun. 28, 2021, now Pat. No. 11,548,811, which is a
(Continued)

(51) Int. Cl.

| | |
|---|---|
| ***C03C 17/22*** | (2006.01) |
| ***C01B 32/182*** | (2017.01) |
| ***C01B 32/186*** | (2017.01) |

(52) U.S. Cl.
CPC ............ *C03C 17/22* (2013.01); *C01B 32/182* (2017.08); *C01B 32/186* (2017.08);
(Continued)

(58) Field of Classification Search
CPC .................................................... C01B 32/186
See application file for complete search history.

(56) References Cited

U.S. PATENT DOCUMENTS 4,025,689 A * 5/1977 Kobayashi ............ C01B 32/382 376/916
4,483,700 A 11/1984 Forker et al.
(Continued)

FOREIGN PATENT DOCUMENTS

CN 103213980 A 7/2013
CN 103215469 A 7/2013
(Continued)

OTHER PUBLICATIONS

"High Quality Reduced Graphene Oxide Repairing with Multi-layered Graphene Ball Nanostructures", Scientific Reports, Nov. 10, 2013, 1-8.*

(Continued)

*Primary Examiner* — Alex A Rolland
(74) *Attorney, Agent, or Firm* — Svetlana Z. Short

(57) ABSTRACT

Disclosed herein are graphene coatings characterized by a porous, three-dimensional, spherical structure having a hollow core, along with methods for forming such graphene coatings on glasses, glass-ceramics, ceramics, and crystal-
(Continued)

line materials. Such coatings can be further coated with organic or inorganic layers and are useful in chemical and electronic applications.

29 Claims, 7 Drawing Sheets

Related U.S. Application Data division of application No. 16/350,090, filed as application No. PCT/US2017/023343 on Mar. 21, 2017, now Pat. No. 11,059,741.

(60) Provisional application No. 62/311,063, filed on Mar. 21, 2016.

(52) U.S. Cl.
CPC ...... *C01B 2204/02* (2013.01); *C01B 2204/04* (2013.01); *C01B 2204/32* (2013.01); *C01P 2002/82* (2013.01); *C01P 2002/85* (2013.01); *C01P 2004/02* (2013.01); *C01P 2004/03* (2013.01); *C01P 2004/34* (2013.01); *C01P 2004/62* (2013.01); *C01P 2004/64* (2013.01); *C03C 2217/28* (2013.01); *C03C 2217/425* (2013.01); *C03C 2218/152* (2013.01); *C03C 2218/328* (2013.01); *C03C 2218/33* (2013.01)

(56) References Cited

U.S. PATENT DOCUMENTS

| | | | | |
|---|---|---|---|---|
| 5,674,790 | A | 10/1997 | Araujo | |
| 7,666,511 | B2 | 2/2010 | Ellison et al. | |
| 2006/0197953 | A1* | 9/2006 | Perez | B82Y 15/00 356/445 |
| 2011/0269299 | A1 | 11/2011 | Zhang et al. | |
| 2014/0199542 | A1* | 7/2014 | Li | G02B 1/14 427/596 |
| 2014/0255500 | A1* | 9/2014 | Son | B82Y 30/00 424/490 |
| 2015/0017429 | A1* | 1/2015 | Li | B05D 1/28 118/712 |
| 2016/0002103 | A1 | 1/2016 | Wang et al. | |

FOREIGN PATENT DOCUMENTS

| | | | |
|---|---|---|---|
| CN | 105253877 | A | 1/2016 |
| CN | 105891263 | A | 8/2016 |
| WO | 2016/016660 | A2 | 2/2016 |

OTHER PUBLICATIONS

Database Inspec [Online] The Institution of Electrical Engineers, Stevenage, GB; Aug. 1968, Tanichev I N: "Theory of coupled nonlinear resonant circuits", XP002770446, 9 pages.

Database Inspec [Online] The Institution of Electrical Engineers, Stevenage, GB; Mar. 1973, Prahlad T S: "Mean velocity profiles in three-dimensional incompressible turbulent boundary layers", XP002770447.

Haining Huang et al: "A three-dimensional elastic macroscopic graphene network for thermal management application", Journal of Materials Chemistry A: Materials for Energy and Sustainability, vol. 2, No. 43, Jan. 1, 2014, pp. 18215-18218, XP055373869.

International Search Report of the International Searching Authority; PCT/US2017/023343; Mailed Jun. 13, 2017; 11 Pages; European Patent Office.

Kim et al., "High Quality Reduced Graphene Oxide through Repairing with Multi-layered Graphene Ball Nanostructures", Scientific Reports, Nov. 10, 2013, pp. 1-8. (Year: 2013).

Liu et al; "Strategies for Chemical Modification of Graphene and Applications of Chemically Modified Graphene"; J. Mater. Chem., 2012, 22, pp. 12345-123452.

Mi Zhou et al: "Directional architecture of graphene/ceramic composites with improved thermal conduction for thermal applications", Journal of Meterials Chemistry A: Materials for Energy and Sustainability, vol. 2, No. 7, Jan. 1, 2014, pp. 2187-2193, XP055374137.

* cited by examiner

Cursor Height = 74.8 nm
Cursor Height = 250 nm

TRANSPARENT SUBSTRATES COMPRISING THREE-DIMENSIONAL POROUS CONDUCTIVE GRAPHENE FILMS AND METHODS FOR MAKING THE SAME

This application is a divisional of U.S. patent application Ser. No. 17/359,739 filed on Jun. 28, 2021, which is a divisional application of U.S. patent application Ser. No. 16/350,090 filed on Sep. 21, 2018, which claims the benefit of priority under 35 U.S.C. § 371 of International Application No. PCT/US2017/23343, filed on Mar. 21, 2017, which claims the benefit of priority under 35 U.S.C. § 119 of U.S. Provisional Application No. 62/311,063, filed on Mar. 21, 2016, the content of each of which is relied upon and incorporated herein by reference in its entirety.

FIELD OF THE DISCLOSURE

The disclosure relates generally to transparent substrates comprising graphene films, and more particularly to transparent glass substrates comprising three-dimensional conductive graphene films and methods for making the same.

BACKGROUND

Graphene is a two-dimensional carbon material that has the potential to be useful in a wide variety of applications due to its desirable properties. Graphene has chemically stability, mechanical strength, and flexibility, while possessing a high optical transmittance and electrical conductivity. Certain applications, such as displays and photovoltaics, require transparent conductive films. Graphene can potentially replace currently used conductive oxide films, e.g., indium tin oxide (ITO) in such applications. However, while graphene possesses a large number of properties that make it particularly attractive in such applications, it currently is only primarily used in research as methods for forming, processing, and working with the material continue to advance. Additionally, one limitation that graphene has is that because it is a monolayer, it is a two-dimensional structure with essentially no thickness. This can be an issue particularly where the substrates and materials the graphene is interacting with are thick and/or rough. In such situations, the two-dimensional nature of the graphene may be disadvantageous. Accordingly, it is desirable to obtain three-dimensional graphene structures that retain the advantages of graphene sheets. However, until now, has been difficult to obtain materials with these properties.

SUMMARY

The disclosure relates, in various embodiments, to articles comprising three-dimensional graphene structures having a hollow core along with methods for forming a three-dimensional graphene film on a substrate. The graphene coatings can be chemically modified to incorporate other elements or groups such that they can be used for any number of chemical, physical, electronic, biological, or other processes, such as a carrier for catalysts. Alternatively, the graphene structures can be coated with additional materials to form electronic or other device structures.

In an aspect (1), the disclosure provides an article comprising a substrate having a surface roughness, the substrate comprising: a) a glass, a glass ceramic, a ceramic, an inorganic crystalline or polycrystalline material; and a coating layer having a thickness from about 20 nm to about 800 μm adhered to the substrate, the coating layer comprising: b) a porous, three-dimensional construction having an average surface area from about 200 $m^2/g$ to about 2200 $m^2/g$ and characterized by at least one optionally substituted, three-dimensional graphene structure having a hollow core, wherein: i) the at least one three-dimensional graphene structure comprises five or less layers of graphene; and ii) the at least one three-dimensional graphene spherical structure has an average diameter from about 30 nm to about 500 nm.

In an aspect (2), the disclosure provides the article of aspect (1), wherein the hollow core of the at least one three-dimensional graphene structure is substantially free of a metal or metal oxide. In an aspect (3), the disclosure provides the article of aspect (1) or aspect (2), wherein the substrate comprises a glass or glass ceramic. In an aspect (4), the disclosure provides the article of aspect (3), wherein the glass or glass ceramic comprises fused silica. In an aspect (5), the disclosure provides the article of any of aspects (1)-(4), wherein the surface roughness of the substrate is 2 nm or less. In an aspect (6), the disclosure provides the article of any of aspects (1)-(5), wherein the at least one optionally substituted, three-dimensional hollow graphene spherical structure comprises two or less layers of graphene. In an aspect (7), the disclosure provides the article of aspect (6), wherein each the at least one substituted, three-dimensional hollow graphene spherical structure comprises approximately a monolayer. In an aspect (8), the disclosure provides the article of any of aspects (1)-(7), wherein the average diameter as measured by scanning electron microscope of the at least one optionally substituted, three-dimensional graphene structure is from about 50 nm to about 500 nm as measured by scanning electron microscope.

In an aspect (9), the disclosure provides the article of any of aspects (1)-(8), wherein the thickness of the coating layer is from about 500 nm to about 800 μm. In an aspect (10), the disclosure provides the article of any of aspects (1)-(9), wherein the average surface area of the porous, three-dimensional construction is from about 500 to 1500 $m^2/g$. In an aspect (11), the disclosure provides the article of any of aspects (1)-(10), wherein the porous, three-dimensional construction has a porosity of from about 90% to about 99.6% as measured by scanning electron microscope. In an aspect (12), the disclosure provides the article of any of aspects (1)-(11), wherein the adhesion of the coating layer to the transparent substrate exhibits an effective adhesion energy at the interface of the coating layer and the transparent substrate of from about 0.1 $J/m^2$ to about 4 $J/m^2$. In an aspect (13), the disclosure provides the article of any of aspects (1)-(12), wherein the substrate comprises a transparent material and the optical transmission of the article, as measured by ultraviolet-visible spectroscopy, is greater than 60% at 550 nm.

In an aspect (14), the disclosure provides an article comprising a substrate comprising a porous glass or glass ceramic having a structure with voids therein; an embedded layer intercalated into void of the porous glass or glass ceramic structure, the embedded layer comprising: a porous, three-dimensional construction having an average surface area from about 200 $m^2/g$ to about 2200 $m^2/g$ and characterized by at least one optionally substituted, three-dimensional graphene structure having a hollow core, wherein: i) the at least one three-dimensional graphene structure comprises five or less layers of graphene; and ii) the at least one three-dimensional graphene spherical structure has an average diameter from about 30 nm to about 500 nm. In an aspect (15), the disclosure provides the article of aspect (14), wherein the hollow core of the at least one three-dimensional graphene structure is substantially free of a metal or metal oxide. In an aspect (16), the disclosure provides the article of aspect (15) or aspect (14), wherein the substrate comprises a glass. In an aspect (17), the disclosure provides the article of aspect (16), wherein the glass comprises fused silica. In an aspect (18), the disclosure provides the article of any of aspects (14)-(17), wherein the surface roughness of the substrate is 2 nm or less. In an aspect (19), the disclosure provides the article of any of aspects (14)-(18), wherein the at least one optionally substituted, three-dimensional hollow graphene spherical structure comprises two or less layers of graphene. In an aspect (20), the disclosure provides the article of aspect (19), wherein each the at least one substituted, three-dimensional hollow graphene spherical structure comprises approximately a monolayer.

In an aspect (21), the disclosure provides the article of any of aspects (14)-(20), wherein the average diameter as measured by scanning electron microscope of the at least one optionally substituted, three-dimensional graphene structure is from about 50 nm to about 500 nm as measured by scanning electron microscope. In an aspect (22), the disclosure provides the article of any of aspects (14)-(21), wherein the thickness of the coating layer is from about 20 nm to about 800 □m. In an aspect (23), the disclosure provides the article of any of aspects (14)-(1227), wherein the average surface area of the porous, three-dimensional construction is from about 500 to 1500 $m^2/g$. In an aspect (24), the disclosure provides the article of any of aspects (14)-(23), wherein the porous, three-dimensional construction has a porosity of from about 90% to about 99.6% as measured by scanning electron microscope. In an aspect (25), the disclosure provides the article of any of aspects (14)-(24), wherein the adhesion of the coating layer to the transparent substrate exhibits an effective adhesion energy at the interface of the coating layer and the transparent substrate of from about 0.1 $J/m^2$ to about 4 $J/m^2$. In an aspect (26), the disclosure provides the article of any of aspects (14)-(25), wherein the substrate comprises a transparent material and the optical transmission of the article, as measured by ultraviolet-visible spectroscopy, is greater than 60% at 550 nm.

In an aspect (27), the disclosure provides method for forming at least one optionally substituted, three-dimensional hollow graphene structure, the method comprising: (a) depositing a metal from a source onto a surface of a substrate to form a metallic layer comprising metal structures; (b) depositing, via chemical vapor deposition of a carbon-source gas with an optional hydrogen-gas source, an optionally substituted graphene layer on the metallic layer to form a graphene-coated metallic layer; and (c) optionally removing the metallic layer by thermal or chemical processes to create an optionally substituted, three-dimensional hollow graphene structure. In an aspect (28), the disclosure provides the method of aspect (27), wherein steps (b) and (c) occur simultaneously or partially overlap. In an aspect (29), the disclosure provides the method of aspect (28), wherein the metal comprises a transition metal and the chemical vapour deposition occurs at a temperature from about 200° C. to about 800° C. In an aspect (30), the disclosure provides the article of any of aspects (27)-(29), wherein the metal structures comprises copper, cobalt, nickel, iron, zinc, silver, or gold particles. In an aspect (31), the disclosure provides the method of aspect (30), wherein the particles are nanoparticles having a diameter along their longest axis from about 5 nm to about 500 nm. In an aspect (32), the disclosure provides the article of any of aspects (27)-(31), wherein the carbon-source gas is chosen from $CH_4$, $C_2H_2$, $CF_4$, $CHF_3$, $C_2F_6$, $C_2H_6$, $C_3H_8$, $C_3H_6$, $C_6H_{14}$, $C_6H_6$, $C_6H_5CH_3$, and combinations thereof. In an aspect (33), the disclosure provides the method of aspect (32), wherein the carbon-source gas has a pressure of from about $1\times10^{-4}$ to 100 Torr and the chemical vapor deposition is done at a temperature greater than 600° C. In an aspect (34), the disclosure provides the article of any of aspects (27)-(33), where removing of the metallic layer is done by heating the graphene coated metallic layer to a temperature sufficient to vaporize the metallic layer. In an aspect (35), the disclosure provides the article of any of aspects (27)-(24), where removing of the metallic layer is done by chemically by soaking the graphene coated metallic layer a chemical that dissolves or removes the metallic layer. In an aspect (36), the disclosure provides the method of aspect (35), wherein the chemical comprises ammonium persulfate, iron chloride, iron nitrate, copper chloride, hydrochloric acid, nitric acid, sulphuric acid, hydrogen peroxide, and combination thereof. In an aspect (37), the disclosure provides the method of aspect (34), wherein the temperature is 900° C. to 1300° C. greater.

In an aspect (39), the disclosure provides the method of aspect (38), wherein steps (b) and (c) occur simultaneously or partially overlap. In an aspect (40), the disclosure provides the method of aspect (39), wherein the metal comprises a transition metal and the chemical vapour deposition occurs at a temperature from about 200° C. to about 800° C. In an aspect (41), the disclosure provides the article of any of aspects (38)-(40), wherein the metal structures comprises copper, cobalt, nickel, iron, zinc, silver, or gold particles. In an aspect (42), the disclosure provides the method of aspect (30), wherein the particles are nanoparticles having a diameter along their longest axis from about 5 nm to about 500 nm. In an aspect (43), the disclosure provides the article of any of aspects (38)-(42), wherein the carbon-source gas is chosen from $CH_4$, $C_2H_2$, $CF_4$, $CHF_3$, $C_2F_6$, $C_2H_6$, $C_3H_8$, $C_3H_6$, $C_{61}$-114, $C_6H_6$, $C_6H_5CH_3$, and combinations thereof. In an aspect (44), the disclosure provides the method of aspect (43), wherein the carbon-source gas has a pressure of from about $1\times10^{-4}$ to 100 Torr and the chemical vapor deposition is done at a temperature greater than 600° C. In an aspect (45), the disclosure provides the article of any of aspects (38)-(44), where removing of the metallic layer is done by heating the graphene coated metallic layer to a temperature sufficient to vaporize the metallic layer. In an aspect (46), the disclosure provides the article of any of aspects (38)-(45), where removing of the metallic layer is done by chemically by soaking the graphene coated metallic layer a chemical that dissolves or removes the metallic layer. In an aspect (47), the disclosure provides the method of aspect (46), wherein the chemical comprises ammonium persulfate, iron chloride, iron nitrate, copper chloride, hydrochloric acid, nitric acid, sulphuric acid, hydrogen peroxide, and combination thereof. In an aspect (48), the disclosure provides the method of aspect (45), wherein the temperature is 900° C. to 1300° C. greater.

In an aspect (49), the disclosure provides a device comprising the article of any of aspects (1)-(26). In an aspect (50), the disclosure provides and electronic device of aspect (49). In an aspect (51), the disclosure provides the electronic device of aspect (50), wherein the electronic device comprises an organic light-emitting diode.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

FIGS. 1A and 1B are a top down view (FIG. 1A) and side view (FIG. 1B) of a copper coated surface deposited at a substrate temperature of 250° C. The copper particles are approximately 75 nm tall in FIG. 1B. FIGS. 1C and 1D are a top down view (FIG. 1C) and side view (FIG. 1D) of a copper coated surface deposited at a substrate temperature of 500° C. The copper particles are approximately 250-275 nm tall in FIG. 1D.

(FIG. 2A), 1000° C. (FIG. 2B), and 1100° C. (FIG. 2C).

FIG. 5A is a top down or bird's eye view at 20,000× magnification, FIG. 5B is a top down view at 50,000× magnification, FIG. 5C is a side view at 25,000× magnification, and FIG. 5D is a side view at 100,000× magnification, showing that the structures have a hollow core.

FIG. 9 depicts SEM images of hollow graphene structures made by CVD at 900° C. at 50,000× (FIG. 9A) and 100,000× magnification (FIG. 9B).

DETAILED DESCRIPTION

Figures 1A, 1B, 1C, 1D:
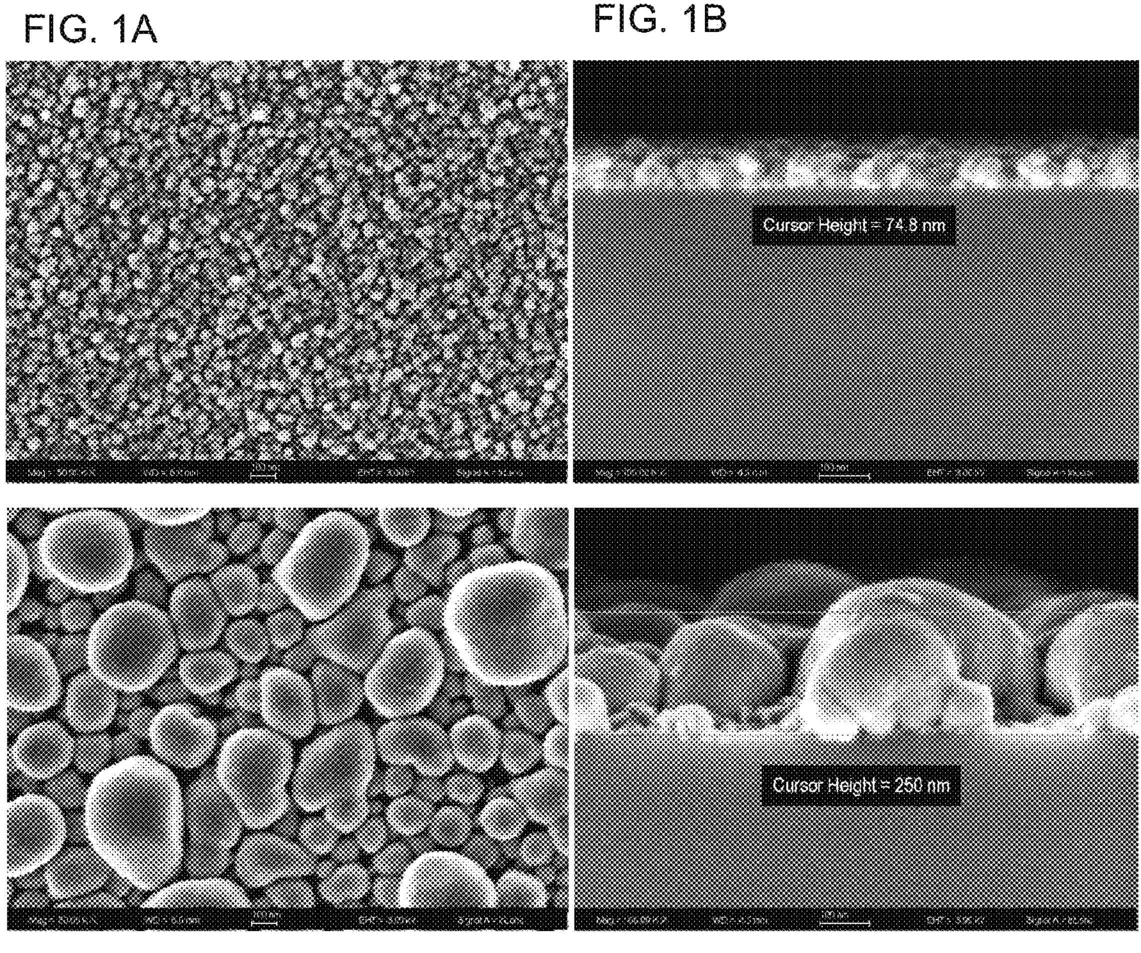
FIGS. 1A-1D show a scanning electron micrograph of copper films composed of copper particles coated onto a high purity fused silica substrate by vapor deposition at different substrate coating temperatures.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a layer" includes examples having two or more such layers unless the context clearly indicates otherwise. Likewise, a "plurality" is intended to denote "more than one." As such, a "plurality of layers" includes two or more such layers, such as three or more such layers, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other. "Substantially free" of a metal or metal oxide may denote that the metal is present at less than 1% w/w, approximately the current detection limit of X-ray photoelectron spectroscopy.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied as alternatives. Thus, for example, implied alternative embodiments to a method that comprises A+B+C include embodiments where a method consists of A+B+C and embodiments where a method consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

3D Graphene Structures and Articles

Disclosed herein are coated substrates comprising a graphene film on at least one surface, wherein the graphene films comprise three-dimensional structures. In some embodiments, the three-dimensional graphene structures comprise hollow structures that form a porous network on the substrate. Also disclosed herein are coatings characterized by three dimensional constructs containing three-dimensional graphene structures, which, in some embodiments, form a porous network or structure on a substrate. The graphene materials described herein are advantageous in that they comprise high purity graphene, meaning, as used herein, less than 10, 5, 2, 1, or essentially 0% w/w other elements or other forms of carbon present in the material, with low defect sites, meaning, as used herein, low D band intensity. The graphene layer thickness can be controlled to allow for monolayers or multilayer structures. The three-dimensional graphene structures embodied herein have high surface areas (200-2200 $m^2/g$, which is calculate from 1-10 layers of graphene) and retain good electrical and thermal conductivity properties (the sheet resistivity is from 2 koh·m/sq to 20 koh·m/sq, and the thermal conductivity is approximately 5300 $W \cdot m^{-1} \cdot K^{-1}$), while still being transparent (film with transparency of 50% to 90%).

Graphene is a two-dimensional structure of carbon atoms bonded in a regular hexagonal pattern, where each carbon is bound to 3 adjacent carbons. However, graphene can be modified ("optionally substituted") with the addition or substitution of other atoms or molecules into the structure or bound to the structure. Single atoms that may be doped into (covalently bound to) the graphene structure include B, N, Pt, Co, In, and the like (see, e.g., 12 *Nano Lett.* 141 (2012), herein incorporated by reference in its entirety). Other covalent modifications are also possible, but can disrupt the conjugation of the graphene structure. Use of residual graphene oxide (GO) sites can be used for covalent modification. For example, the GO site can be an attachment point for polymers or porphyrins (22 *J. Mater. Chem.* 12435 (2012), herein incorporated by reference in its entirety). Alternatively, the graphene structure can be chemically modified through indirect interactions that minimize disruption of the graphene structure. Non-covalent modifications, such as use of van der Waals forces, electrostatic interactions, hydrogen bonding, coordination bonds, or π-π stacking can be used to create hybrid graphene materials (22 *J. Mater. Chem.* 12435 (2012), herein incorporated by reference in its entirety). Such modifications allow for polymer-graphene nanocomposites, graphene-graphene oxide composites, graphene-metal interactions via intercalated oxygen, etc.

Figures 5A, 5B, 5C, 5D, 5E:
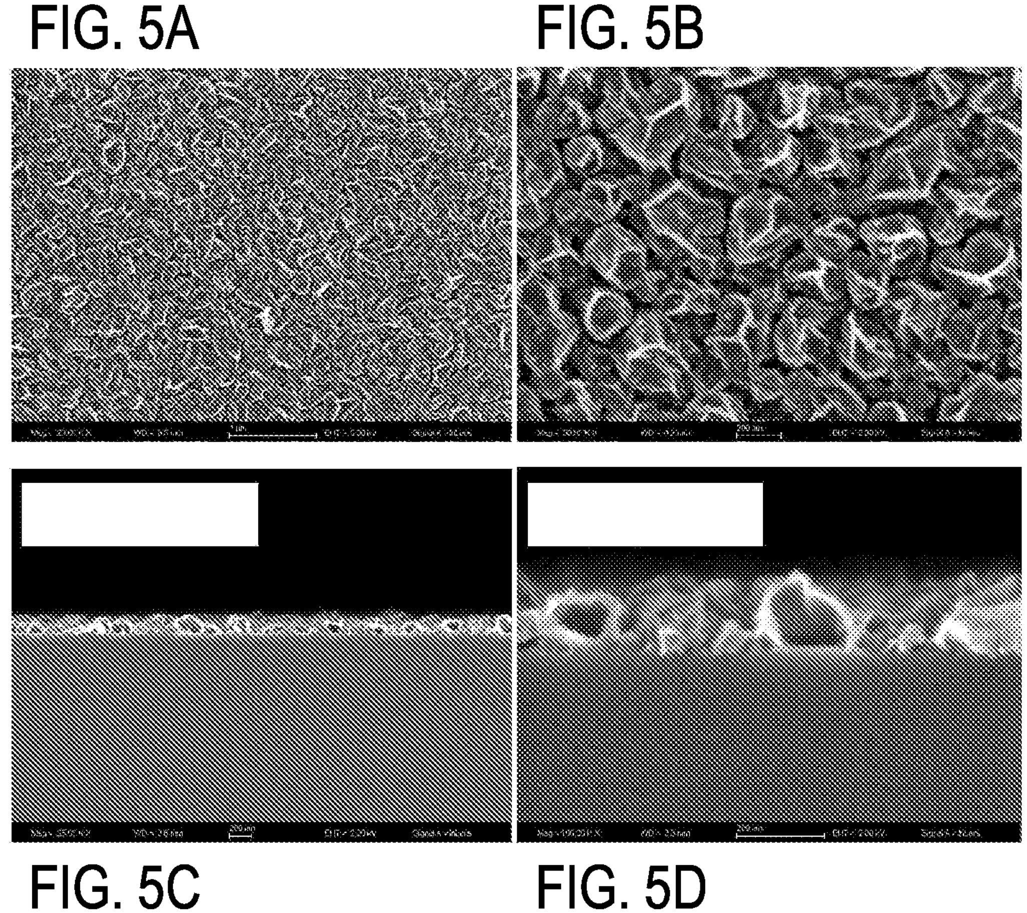
FIGS. 5A-5D present SEM images of a three dimensional graphene structure formed by CVD at 1000° C. for 30 minutes with 0.2 Torr 1:1 ratio of $C_2H_2/H_2$ on a copper film deposited by CVD on a $SiO_2$ substrate at 250° C.
FIG. 5E shows an energy dispersive X-ray (EDX) spectrum from the three dimensional graphene structure supported on fused $SiO_2$ glass.

FIGS. 5A-5D provide visual examples of embodiments of three-dimensional (or "3D") graphene structures described herein. The figures show the 3D graphene structures comprise hollow-core objects having irregular and convoluted shapes. In some embodiments, the 3D graphene structures are approximately or roughly spherical. However, due forming methods and processes, the 3D graphene structures may take forms that are somewhat less spherical, especially when viewed from an angle orthogonal to the substrate (or top down or "bird's-eye" view). In particular, as shown in FIG. 5B, the 3D graphene structures can have any number of shapes when viewed top down. The graphene structures shown in FIGS. 5A-5D would all be considered 3D graphene structures as defined within this application as all have a side view profile that presents a hollow three dimensional structure. The 3D graphene structures or articles comprising these structures may be further defined by other aspects of the composition, such as the number of graphene layers, the average diameter or surface area of the 3D structures, or the porosity of the layer.

Looking at FIG. 5D again, the graphene structures have a hollow core and comprise an inner volume defined by the graphene structure. Depending on the number of layers of graphene deposited, the graphene structures can comprise anywhere from a monolayer up to multiple layers of graphene. Generally, to optimize the graphene properties, the number of layers is kept below 50, 10, 5, or 2 or the graphene is formed as a monolayer. The three dimensional graphene structures can have a diameter (measured as the longest dimension wall-to-opposite wall across the hollow formed by the graphene structure) anywhere from about 5 nm to about 1000 nm, with an average diameter for the structures from about 10 nm to about 500 nm, wherein the average diameter is measured via microscopic means and is calculated as the root mean square average of the diameter of the graphene structures in a 2 mm×2 mm square. In some embodiments, the average diameter for the graphene structures is from about 20 nm to about 500 nm, about 50 nm to about 500 nm, about 20 nm to about 400 nm, about 50 nm to about 400 nm, about 50 nm to about 250 nm, or about 20 nm to about 250 nm.

The graphene structures embodied herein are generally of high purity. High purity, as used herein, means the graphene structures comprise less than 10, 5, 2, 1, or essentially 0% other elements or other forms of carbon present in the material. Measured XPS and SIMS did not observe Cu, which is the major possible contaminant element from the coating method. However, as noted above, graphene can be modified ("optionally substituted") with the addition or substitution of other atoms or molecules into the structure or bound to the structure. Optionally substituted graphenes generally comprise less than 5, 2, or 1% w/w other elements.

In some embodiments, the graphene structures embodied herein have low defect sites. Defects are measured via the presence of a D band in the Raman spectrum. The D-mode is caused by disordered structure of graphene. The presence of disorder in $sp^2$-hybridized carbon systems results in resonance Raman spectra, and thus makes Raman spectroscopy one of the most sensitive techniques to characterize disorder in $sp^2$ carbon materials. D band intensity can be a function of the defect, so can be difficult to quantify. Although some embodied graphene films have a moderate Raman D band, in some cases due to optional substitution of the graphene film, it was possible to make films with very small D band, which demonstrates the feasibility of making low-defect site graphene.

Figure 7:
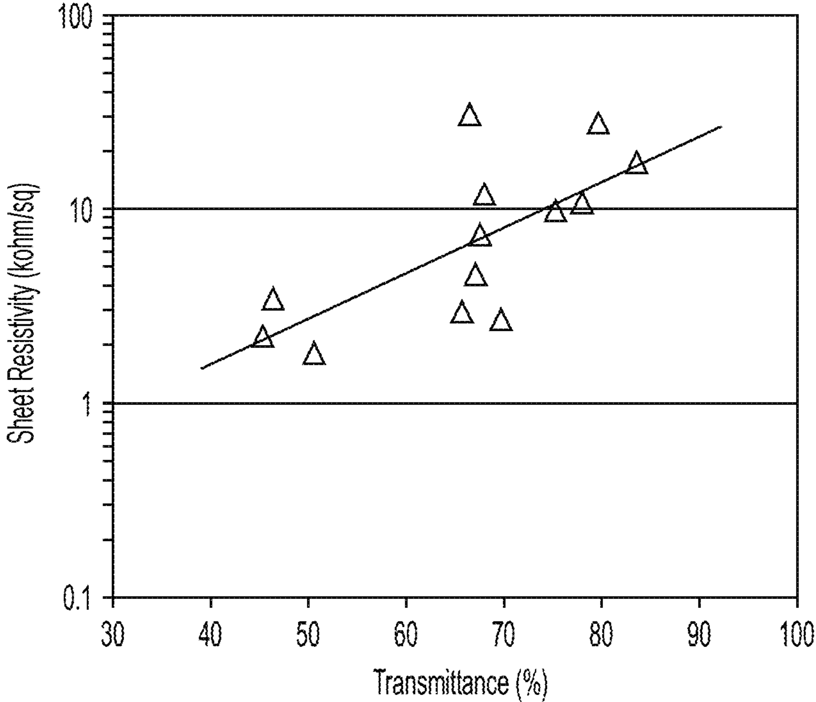
FIG. 7 depicts the sheet resistivity as a function of transmittance at 550 nm for embodied porous graphene films.

The graphene structures described herein can also have high thermal conductivities, similar to those of planar graphene. In some embodiments, the thermal conductivity of the graphene structures described herein is from about 400 to about 2500 $W \cdot m^{-1}K^{-1}$, about 500 to about 1500 $W \cdot m^{-}{}_{1}K^{-1}$, or about 500 to about 800 $W \cdot m^{-1} \cdot K^{-1}$ at room temperature. Similarly, the graphene structures described herein retain electrical properties that are similar to those shown in planar graphene. According to various embodiments, the resistance of the graphene film can be less than about 100 KΩ/sq, such as less than about 90 KΩ/sq, less than about 80 KΩ/sq, less than about 70 KΩ/sq, less than about 60 KΩ/sq, less than about 50 KΩ/sq, less than about 40 KΩ/sq, less than about 30 KΩ/sq, less than about 20 KΩ/sq, or less than about 10 KΩ/sq, (e.g., less than about 9.5, 8.5, 7.5, 6.5, 5.5, 4.5, 3.5, 2.5, 1.5, or 0.5 KΩ/sq) including all ranges and subranges there between. FIG. 7 provides a graph comparing transmittance to sheet resistivity for embodied three dimensional graphene films. As can be seen in the figure, there is a general linear correlation between transmittance and higher sheet resistivities. The top two data points are from high $H_2$ content CVD gas mixture and were not integrated into the line calculation. The results indicate that the quality of the films is similar, with only the difference being in thickness. As $H_2$ content increases, the graphene film can be etched and not well connected, and therefore have higher resistance.

While the graphene structures described herein may not be planar, they still show high levels of transparency. In some embodiments, the 3D graphene structure has absorbance from about 2.3% to about 40% at 550 nm when measured using spectroscopic methods. The absorbance of the graphene can be found by measuring the absorbance a 3D graphene structure coated substrate placed at an angle orthogonal to the incident light beam, and comparing the absorbance to that of a clean, uncoated substrate. Articles or coatings comprising the embodied graphene structures have absorbances from about 5% to about 40% at 550 nm when measured as a coating on a 1 mm thick fused silica substrate, where the substrate is orthogonal to the light beam. In such embodiments, the absorbance can depend on the nature of the coating, the number of graphene layers, the structure of the 3D graphene structure, optional substituents, and the like. In some embodiments, the transmittance of the graphene structure is from about 60% to about 90% at 550 nm.

While described in more detail below, the graphene structures described herein can be formed via deposition of graphene films on metal particles or surfaces. The metal particles are typically completely removed in the process to provide a graphene structure substantially free of a metal or metal oxide, meaning there is less than 10%, less than 5%, less than 1%, or less than 0.1% w/w of the original deposition metal or metal oxide present, as measured by XPS or SIMS, however other surface chemistry method could also possibly be used. We used in our sample measurements. However, in some embodiments, it is advantageous to retain at least some of the metal in the graphene structure. For example, copper can be used as catalyst for growth of graphene. If the CVD is at less than 950° C., some or all copper can be retained. Nickel, Gold, etc. can also be used as catalyst. If not removed after coating, these metals will stay as the core of the graphene structure. These metals may be nanoparticles, nanoshells, or other types of materials. For example, in some embodiments, the core could be a gold particle that is partially removed, and then the remaining particle is chemically modified with thiols. Alternatively, the core could be a copper particle that is partially removed and then chemically modified to form $Cu_2O$.

Another important property of the 3D graphene structures is the adhesion of the material to the surface. The adhesion of the graphene layer can be controlled and modified by surface and metal deposition layer properties. In some embodiments, the effective adhesion energy at the interface of the three dimensional construction and the transparent substrate is from about 0.1 $J/m^2$ to about 4 $J/m^2$. In some embodiments, the effective adhesion energy is from about 0.1 $J/m^2$ to about 2 $J/m^2$, about 0.1 $J/m^2$ to about 1 $J/m^2$, about 0.1 $J/m^2$ to about 0.5 $J/m^2$, about 0.5 $J/m^2$ to about 4 $J/m^2$, about 0.5 $J/m^2$ to about 2 $J/m^2$, about 0.5 $J/m^2$ to about 1 $J/m^2$, about 1 $J/m^2$ to about 4 $J/m^2$, about 1 $J/m^2$ to about 2 $J/m^2$, or about 2 $J/m^2$ to about 4 $J/m^2$.

The graphene structures alone, or in combination with other layers, particles, coatings, or elements can form a three-dimensional construction that is porous, has a controllable thickness, and a relatively high surface area. In such embodiments, additional elements incorporated into the three-dimensional construction can be partially or fully between the substrate and the graphene structures, fully or partially between the graphene structures and any subsequent layers opposite the substrate, or integrated or on the graphene structures, and can be discrete or continuous elements.

In some embodiments, the three-dimensional construction has an average surface area from about 200 $m^2/g$ to about 2200 $m^2/g$, calculated from 1-10 layers of graphene (as present) as measured by gas sorption techniques. In some embodiments, the average surface area of the coating layer is from about 500 to 2200 $m^2/g$, about 500 to 2000 $m^2/g$, about 500 to 1800 $m^2/g$, about 500 to 1500 $m^2/g$, about 500 to 1000 $m^2/g$, about 1000 to 2200 $m^2/g$, about 1000 to 2000 $m^2/g$, about 1000 to 1800 $m^2/g$, about 1000 to 1500 $m^2/g$, about 1500 to 2200 $m^2/g$, about 1500 to 2000 $m^2/g$, about 1500 to 1800 $m^2/g$, about 1800 to 2200 $m^2/g$, about 1800 to 2000 $m^2/g$, or about 2000 to 2200 $m^2/g$.

Porosity, as used herein, is a measure of the void (i.e. "empty") spaces in the three-dimensional construct, and is a fraction of the volume of voids over the total volume as a percentage between 0 and 100%. In some embodiments, the porosity of the three dimensional construct is from about 90% to about 99.6% as measured by scanning electron microscope.

The three-dimensional construction comprising the 3D graphene structures can form a coating alone or in combination with other layers, particles, coatings, or elements. Additional layers that can be added or included in the three-dimensional construction include conductive metal or metal oxide coatings, such as gold, silver, platinum, copper, transparent conductive oxides, nonconductive or semiconductive materials, including polymers, silicon, inorganic oxides, or other materials, such as nanoparticles, quantum dots, fullerenes, nanotubes, and the like. The coating comprising the three-dimensional construction can have an average thickness, as measured by microscopy or other known means, from about 20 nm to about 800 μm, about 20 nm to about 500 μm, about 20 nm to about 300 μm, about 20 nm to about 100 μm, about 20 nm to about 50 μm, about 20 nm to about 10 μm, about 20 nm to about 1 μm, about 20 nm to about 500 nm, about 50 nm to about 800 μm, about 50 nm to about 500 μm, about 50 nm to about 300 μm, about 50 nm to about 100 μm, about 50 nm to about 50 μm, about 50 nm to about 10 μm, about 50 nm to about 1 μm, about 50 nm to about 500 nm, about 100 nm to about 800 μm, about 100 nm to about 500 μm, about 100 nm to about 300 μm, about 100 nm to about 100 μm, about 100 nm to about 50 μm, about 100 nm to about 10 μm, about 100 nm to about 1 μm, about 100 nm to about 500 nm, about 500 nm to about 800 μm, about 500 nm to about 500 μm, about 500 nm to about 300 μm, about 500 nm to about 100 μm, about 500 nm to about 50 μm, about 500 nm to about 10 μm, about 500 nm to about 1 μm, about 1 μm to about 800 μm, about 1 μm to about 500 μm, about 1 μm to about 300 μm, about 1 μm to about 100 μm, about 1 μm to about 50 μm, about 1 μm to about 10 μm, about 5 μm to about 800 μm, about 5 μm to about 500 μm, about 5 μm to about 300 μm, about 5 μm to about 100 μm, about 5 μm to about 50 μm, about 5 μm to about 10 μm, about 5 μm to about 800 μm, about 5 μm to about 500 μm, about 5 μm to about 300 μm, about 5 μm to about 100 μm, about 5 μm to about 50 μm, about 5 μm to about 10 μm, about 10 μm to about 800 μm, about 10 μm to about 500 μm, about 10 μm to about 300 μm, about 10 μm to about 100 μm, or about 10 μm to about 50 μm.

The coating comprising the 3D graphene structures is adhered to a substrate. Materials suitable for use as substrates in the methods and/or products disclosed herein can generally include any desired inorganic material, either transparent or non-transparent, e.g., glass, glass-ceramic, ceramic, inorganic crystalline or polycrystalline materials such as sapphire, and the like, that can be heated to 500° C., 600° C., 700° C., 800° C., 900° C., or 1000° C. or above. In at least one non-limiting embodiment, the substrate is a glass substrate. Exemplary glass substrates can comprise, for example, any glass known in the art that is suitable for graphene deposition and/or display devices including, but not limited to, fused silica, alum inosilicate, alkali-alum inosilicate, borosilicate, alkali-borosilicate, aluminoborosilicate, alkali-aluminoborosilicate, soda lime silicate, and other suitable glasses. In certain embodiments, the substrate may have a thickness of less than or equal to about 3 mm, for example, ranging from about 0.1 mm to about 2.5 mm, from about 0.3 mm to about 2 mm, from about 0.7 mm to about 1.5 mm, or from about 1 mm to about 1.2 mm, including all ranges and subranges there between. Non-limiting examples of commercially available glasses suitable for use as a light filter include, for instance, EAGLE XG®, Iris™, Lotus™, Willow®, Gorilla®, HPFS®, and ULE® glasses from Corning Incorporated. Suitable glasses are disclosed, for example, in U.S. Pat. Nos. 4,483,700, 5,674,790, and 7,666,511, which are incorporated herein by reference in their entireties, which are incorporated herein by reference in their entireties.

The substrate can, in various embodiments, be transparent or substantially transparent before and/or after coating with the coating layer. As used herein, the term "transparent" is intended to denote that the substrate, at a thickness of approximately 1 mm, has an optical transmission, as measured by UV/visible spectroscopy or another known method, of greater than about 60% over the entire visible region (400-700 nm) of the electromagnetic spectrum. In some embodiments, the term "transparent" is intended to denote that the substrate, at a thickness of approximately 1 mm, has an optical transmission of greater than about 60% at 550 nm. For instance, an exemplary transparent substrate or coated substrate may have greater than about 60% transmittance at 400-700 nm, such as greater than about 70%, greater than about 75%, greater than about 80%, greater than about 85%, or greater than about 90% transmittance, including all ranges and subranges there between. Alternatively, an exemplary transparent substrate or coated substrate may have greater than about 60% transmittance at 550 nm, such as greater than about 70%, greater than about 75%, greater than about 80%, greater than about 85%, or greater than about 90% transmittance, including all ranges and subranges there between. In certain embodiments, an exemplary substrate or coated substrate may have a transmittance of greater than about 50% in the ultraviolet (UV) region (100-400 nm), such as greater than about 55%, greater than about 60%, greater than about 65%, or greater than about 75% transmittance, including all ranges and subranges there between.

The substrates described herein can generally be any shape, plenary or 3D structured, such as sheet, tube or honeycomb. In some embodiments, the substrate can comprise a glass sheet having a first surface and an opposing second surface. The surfaces may, in certain embodiments, be planar or substantially planar, e.g., substantially flat and/or level. The substrate can also, in some embodiments, be curved about at least one radius of curvature, e.g., a three-dimensional substrate, such as a convex or concave substrate. The first and second surfaces may, in various embodiments, be parallel or substantially parallel. The substrate may further comprise at least one edge, for instance, at least two edges, at least three edges, or at least four edges. By way of a non-limiting example, the substrate may comprise a rectangular or square sheet having four edges, although other shapes and configurations are envisioned and are intended to fall within the scope of the disclosure.

In some embodiments, the substrate comprises a "high quality" glass or glass ceramic substrate, meaning the substrate has a high flatness and/or low surface roughness. For example, embodiments may have a surface roughness ($R_a$) as measured by AFM of less than 2 nm and/or be free of indentations having diameters larger than 150 μm. In some embodiments, the flatness as measured by Zygo of a flat section of the substrate is better than ±150 μm over a 10 mm×10 mm area and in other embodiments a flat section of the substrate is better than ±50 μm over a 25 mm×25 mm area.

The substrate can have additional coatings on either side, including anti-reflective, anti-microbial, transparent conductive oxides, adhesion coatings, and the like.

Methods of Making the 3D Graphene Articles

Another aspect comprises methods of making the graphene structures, three dimensional constructions comprising the graphene structures, and coatings described herein. Generally, the graphene structures can be made by forming graphene on three dimensional metal or metal oxide particles that have been coated onto a substrate that can undergo high temperatures. At sufficiently high enough temperatures, the metal or metal oxide can be vaporized, leaving a 3D graphene structure on the substrate.

As noted above, the substrate can generally be any inorganic material, including glass, glass ceramic, ceramic, or crystalline or polycrystalline that can be heated to 500-1000° C. or above, or can undergo chemical processes that remove the catalyst. These supports can be in any shape, plenary or 3D structured, such as sheet, tube or honeycomb. They can also be in any microstructure, dense or porous. Materials that can be used include but not limited to, fused silica, alum inosilicate, alkali-alum inosilicate, borosilicate, alkali-borosilicate, aluminoborosilicate, alkali-aluminoborosilicate, soda lime silicate, and other suitable glasses. In certain embodiments, the substrate may have a thickness of less than or equal to about 3 mm, for example, ranging from about 0.1 mm to about 2.5 mm, from about 0.3 mm to about 2 mm, from about 0.7 mm to about 1.5 mm, or from about 1 mm to about 1.2 mm, including all ranges and subranges there between. Non-limiting examples of commercially available glasses suitable for use as a light filter include, for instance, EAGLE XG®, Iris™, Lotus™, Willow®, Gorilla®, HPFS®, and ULE® glasses from Corning Incorporated.

The metal or metal oxide can be coated onto the substrate in any number of methods that ultimately produce a metallic (or metal oxide) layer comprising roughly spherical metal (or metal oxide) structures. Such spherical metal structures can be solid particles or hollow spheres or shells. In some embodiments, the spherical metal coating can be done by metal vapor deposition in vacuum. In metal vapor deposition, the substrate temperature is in the range of from about 100° C. to about 900° C., about 100° C. to about 600° C., or about 200° C. to about 500° C. The metal target temperature is a function of the metal and its vaporization temperature. In some embodiments, it can be at about 800° C. to about 1400° C., about 900° C. to about 1300° C., about 900° C. to about 1200° C., or about 1000° C. to about 1100° C. Under embodied conditions, a metal film with a particle size of 10 nm to 500 nm can be obtained, using, for example, copper at about 1000° C. to about 1100° C. Larger copper particle size films can be obtained at higher substrate temperatures during deposition. Such coated films are generally pure metals. A layer of polymer can be applied on the metal beads or spheres to form metal/polymer composite films.

Alternatively, a solution based process can be used to coat the substrate. In metal slurry coating, a selected particle size of a metal powder is used for making the slurry. Polymer binder can be used for the coating in the liquid carrier, examples of which include, for example, polymethylmethacrylate (PMMA), polystyrene (PS), polypropylene methyl acrylate (PPMA), acrylonitrile butadiene styrene (ABS), polyvinyl pyrrolidone (PVP), polyethylene imine (PEI), polyethylene glycol (PEG), and polyvinyl butyrate (PVB), etc. Multiple coatings may be applied to reach the desired thicknesses. By heating the film to about 600° C. to about 850° C. or more in air, the polymer can be burned out, leaving a pure metallic film.

When using a metal film for graphene growth, the graphene growth can be done by a variety of CVD methods, including plasma-enhanced CVD (PECVD). Any number of carbon sources can be used for the graphene precursor, including, for example, $CH_4$, $C_2H_2$, $CF_4$, $CHF_3$, $C_2F_6$, $C_2H_6$, $C_3H_8$, $C_3H_6$, $C_6H_{14}$, $C_6H_6$, $C_6H_5CH_3$, and combinations thereof. The carbon-source gas flow rate can range, for example, from about 1 sccm (sccm=$cm^3$ per minute at standard temperature and pressure) to about 20 sccm, such as from about 2 sccm to about 18 sccm, from about 3 sccm to about 15 sccm, from about 4 sccm to about 12 sccm, from about 5 sccm to about 10 sccm, or from about 6 sccm to about 8 sccm, including all ranges and subranges therebetween. Depending on the precursor used, CVD graphene growth can be done at different temperatures. For example, when using $CH_4$, a temperature of above 900° C. can be used. When using $C_2H_2$, CVD coating temperature can be as low as 600° C. $H_2$ may be used during the growth for improving the quality of graphene. In some embodiments, the pressure of the CVD gas can be from $1\times10^{-4}$ to 100 Torr. When the CVD is done at <1000° C., the metal support may remain or not be entirely removed. After the coating, the samples generally need to be heated to 1000° C. or above, or reacted via a chemical process to remove the metal support from the films. In embodiments where the coating is done at 1000° C. or above, especially in the case of a copper metal support, a copper-free porous graphene film can be obtained directly.

In embodiments where hydrogen gas ($H_2$) is introduced into the chamber, which may be under vacuum, such introduction can be done at a rate ranging, for instance, from 0 to about 40 sccm, such as from about 1 sccm to about 35 sccm, from about 5 sccm to about 30 sccm, from about 10 sccm to about 25 sccm, or from about 15 sccm to about 20 sccm, including all ranges and subranges therebetween.

In embodiments where a metal/polymer composite film is used, the sample can be heated in vacuum, or in an inert gas, such as $N_2$ or Ar, or in a reduced gas, such as $H_2$, to a temperature of 500-1000° C. (or higher). In such embodiments where copper is present as the support metal, the copper will catalyse the polymer to form graphene while the copper is vaporized at the high temperatures.

In the above graphene formation processes where copper is used as the metal support, graphene first forms on the surface of the copper particles. At 1000° C. and above, the copper vaporizes, and the remaining graphene is left as a 3D structure, which may comprise one or more openings. The graphene structures have a porous three dimensional character. Due to the presence of the copper catalyst, the grown graphene is mono- or few layer graphene with low defects.

While copper is specifically called out in the example above, the metal target can generally be made according to the needs of the CVD or other process being used and from those materials known in the art, for example most transition metals, and in particular copper, cobalt, nickel, iron, zinc, silver, or gold.

The resulting metal particles are three dimensional in nature—generally spherical—but may take forms that are somewhat less spherical, especially when viewed from an angle orthogonal to the substrate (or top down or a "bird's-eye" view). The structures shown in FIGS. 1A-1D would all be considered roughly spherical as defined within this application as all have a side view profile that presents a generally semicircular to circular shape.

According to various embodiments, the methods disclosed herein can include additional optional steps that can be carried out before and/or after deposition of the graphene film on the substrate. For instance, before deposition, the substrate can be optionally cleaned, e.g., using water and/or acidic or basic solutions. In some embodiments, the substrate can be cleaned using water, a solution of $H_2SO_4$ and/or $H_2O_2$, and/or a solution of $NH_4OH$ and/or $H_2O_2$. The substrates can, for example, be rinsed with the solutions or washed for a period of time ranging from about 1 minute to about 10 minutes, such as from about 2 minutes to about 8 minutes, from about 3 minutes to about 6 minutes, or from about 4 minutes to about 5 minutes, including all ranges and subranges there between. Ultrasonic energy can be applied during the cleaning step in some embodiments. The cleaning step can be carried out at ambient or elevated temperatures, e.g., temperatures ranging from about 25° C. to about 150° C., such as from about 50° C. to about 125° C., from about 65° C. to about 100° C., or from about 75° C. to about 95° C., including all ranges and subranges there between. Other additional optional steps can include, for example, cutting, polishing, grinding, and/or edge-finishing of the substrate, to name a few.

The following Examples are intended to be non-restrictive and illustrative only, with the scope of the disclosure being defined by the claims.

EXAMPLES

Example 1

FIGS. 1A-1D are SEM images of a copper film structure coated on fused $SiO_2$ substrates by chemical vapor deposition at the substrate temperature of 250° C. and 500° C. respectively. The copper source is made by copper foil and is heated to 1100° C. for vaporization. The coating chamber vacuum is at $8\times10^{-3}$ Torr, forming copper particles of −30 nm on the 250° C. substrates, and 100-400 nm particles forms on 500° C. substrates. FIG. 1A is a top down view of the copper coated surface at substrate temperature of 250° C. FIG. 1B is a side view of the copper coated surface at substrate temperature of 250° C. FIG. 1C is a top down view of the copper coated surface at substrate temperature of 500° C. and FIG. 1D is a side view of the copper coated surface at substrate temperature of 500° C.

Example 2

Figure 2A:
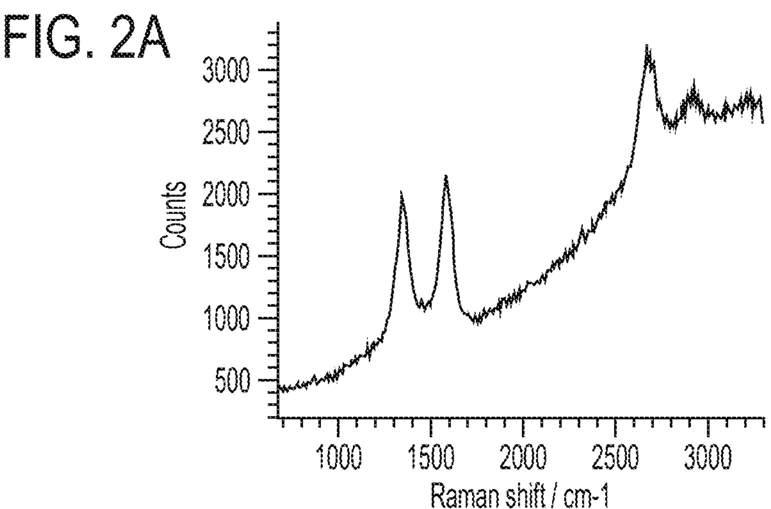
FIGS. 2A-2C are Raman spectra from graphene coated on $Cu/SiO_2$ substrates by chemical vapour deposition (CVD) at growing temperatures (temperature of the substrate) of 900° C.
Figure 2B:
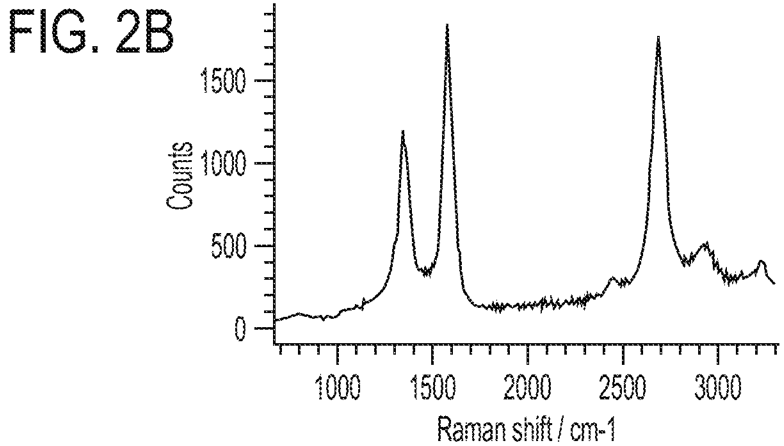
Figure 2C:
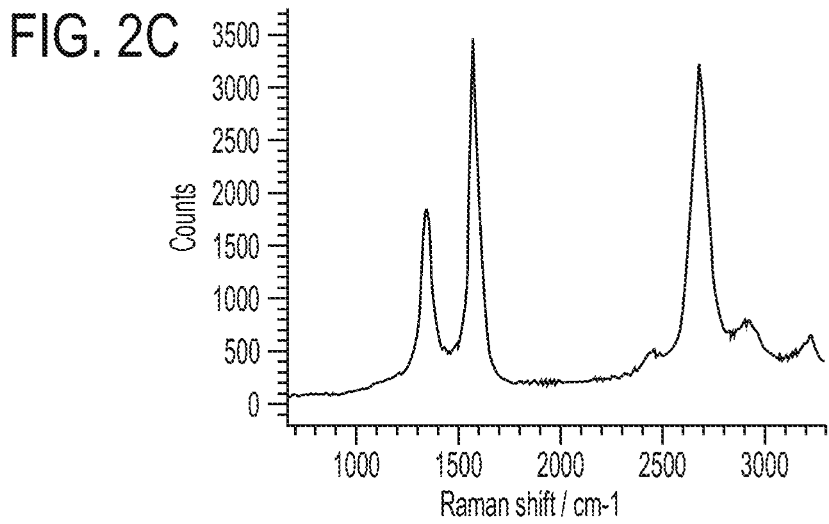
Figure 3:
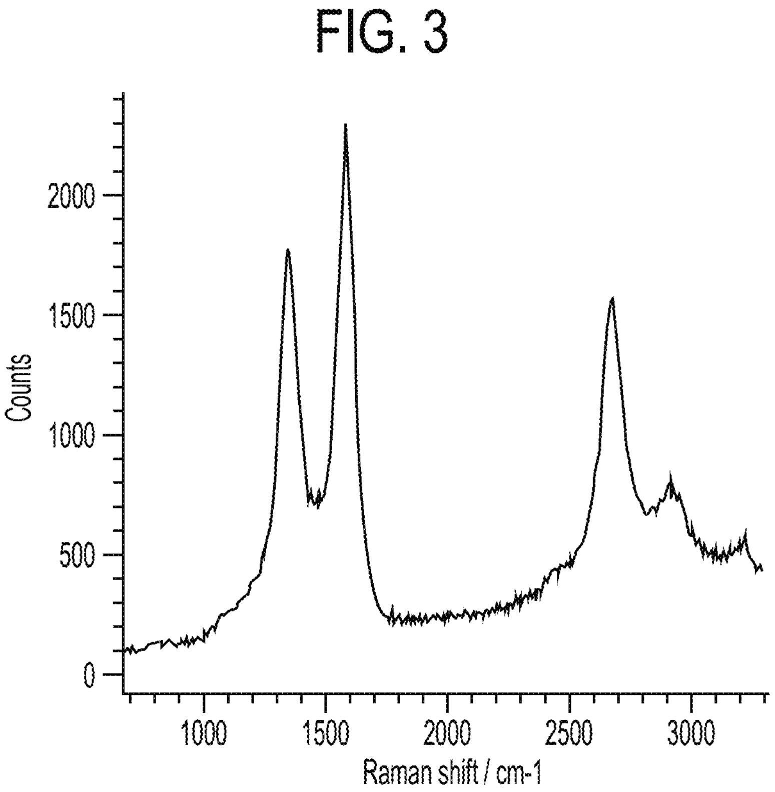
FIG. 3 depicts a Raman spectrum from graphene CVD coated on a $Cu/SiO_2$ substrate at growing temperature of 900° C., and subsequently heated in vacuum to 1100° C. to remove the copper particles via vaporization.

$C_2H_2$ is used as carbon source for growing graphene on high purity fused silica. The gas is introduced at 0.1-0.5 Torr pure $C_2H_2$ for the CVD coating. FIG. 2 shows the Raman spectra from the coated graphene films at three different coating temperatures, 900° C., 1000° C. and 1100° C. The 900° C. coated film has a fluorescent background, which is acquired from copper residuals on the substrates. This sample is re-heated to 1100° C. for 30 minutes in vacuum, and the graphene film is re-measured via Raman spectroscopy (FIG. 3). The fluorescent background is no longer present. This indicates that the copper in the film has vaporized. When the graphene is grown at 1000° C. and 1100° C., no lifted background is observed.

Figure 4:
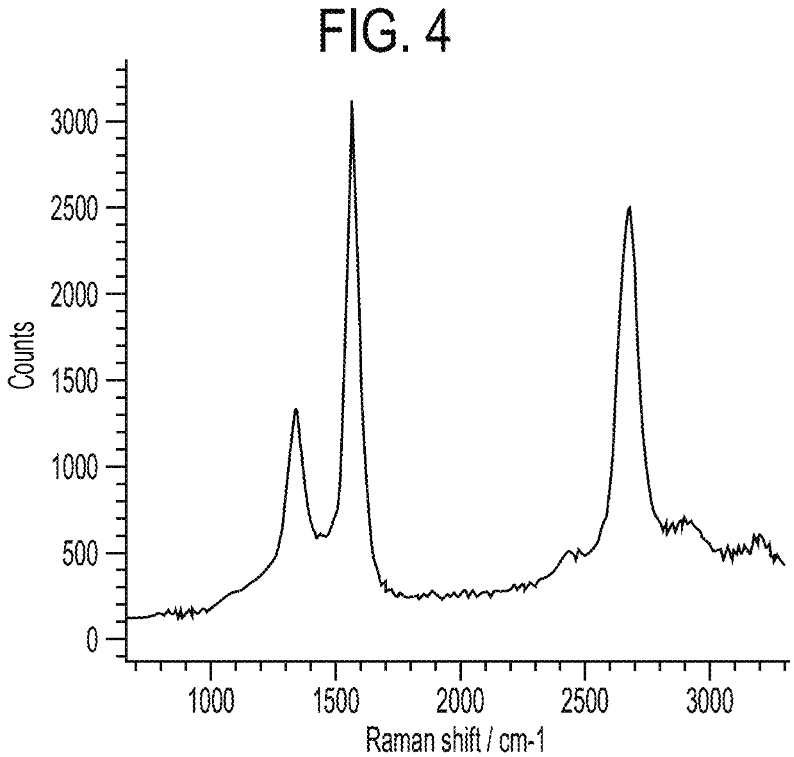
FIG. 4 depicts a Raman spectrum of graphene grown at 1000° C. with $C_2H_2$ and $H_2$ mixed gas present to improve the graphene coating quality.

$H_2$ can be added into the coating gas to improve the graphene coating quality. FIG. 4 shows a Raman spectrum from a graphene film coated at 1000° C. in a 1:2 $C_2H_2$:$H_2$ gas mixture. The D band intensity is found to be reduced, indicating a reduction in the amount of defect sites in the graphene film. From the ratio of G to 2D peaks, the graphene film is a double-layer or few-layer graphene structure.

FIGS. 5A-5E show the SEM images of the graphene film coated at 1000° C. for 30 minutes at 0.2 Torr $C_2H_2/H_2$ with a ratio of 1:1 from various angles and at various magnifications. The film contains graphene formed structures. In each pocket, there was a copper particle that is vaporized at 1000° C., leaving a graphene spherical structure. Upon vaporizing, the copper can form a hole or tear in the graphene, making the structure porous. From the EDX (FIG. 5E), the film does not contain any detectable copper. The formed graphene films have a high surface area since both inside and outside surfaces are available for adsorption and reaction.

Figures 6A, 6B:
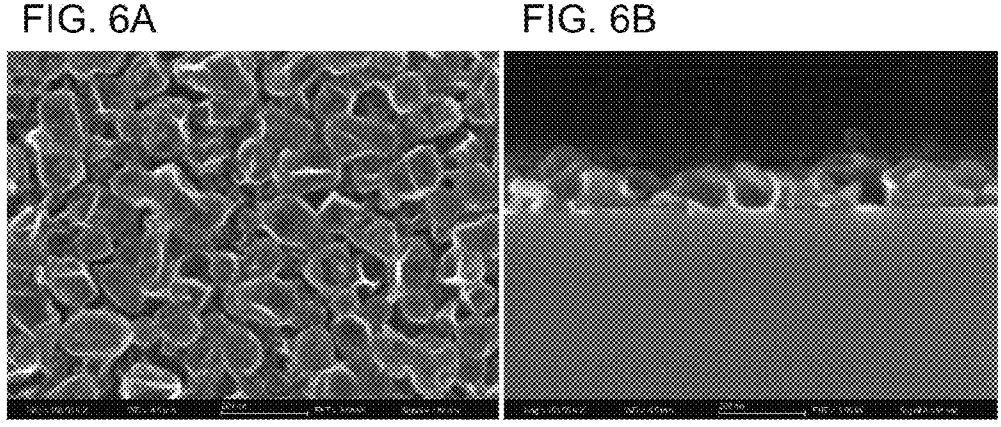
FIGS. 6A and 6B are top down (FIG. 6A) and side view (FIG. 6B) SEM images at 100,000× of a porous graphene film coated on $Cu/SiO_2$ at 900° C. with 0.1 Torr $C_2H_2$ for 30 minutes and then heated to 1100° C. in vacuum for 30 minutes. The copper particles were vapor deposited with the substrate at 250° C.

Similarly, FIGS. 6A-6B show SEM top down and profile images of a porous graphene film CVD coated at 900° C., and then heated in vacuum to 1100° C. for 30 minutes. X-ray photoelectron spectroscopy (XPS) and secondary ion mass spectroscopy (SIMS) are also used for detecting trace copper left in the graphene film. XPS does not detect any copper signal from the remaining layer. SIMS measures different results for Cu/$SiO_2$ substrates coated at 500° C. and 250° C. On the graphene film prepared on Cu/$SiO_2$ with the copper deposited at 500° C., trace amounts of copper are detected at the glass surface, and decrease exponentially with distance from glass surface. The copper in the graphene layer is much less than that found in the substrate. However, no copper is detected by SIMS anywhere in the porous graphene film coated on Cu/$SiO_2$ where the copper is deposited at 250° C.

Test results of the resulting three-dimensional, porous (greater than 90%) graphene structures show the material is transparent and conductive. FIG. 7 shows the sheet resistivity and transmittance at 550 nm of an example porous graphene film. The transmittance is measured by UV-visible spectroscopy.

Example 3

Figures 8A, 8B, 8C, 8D:
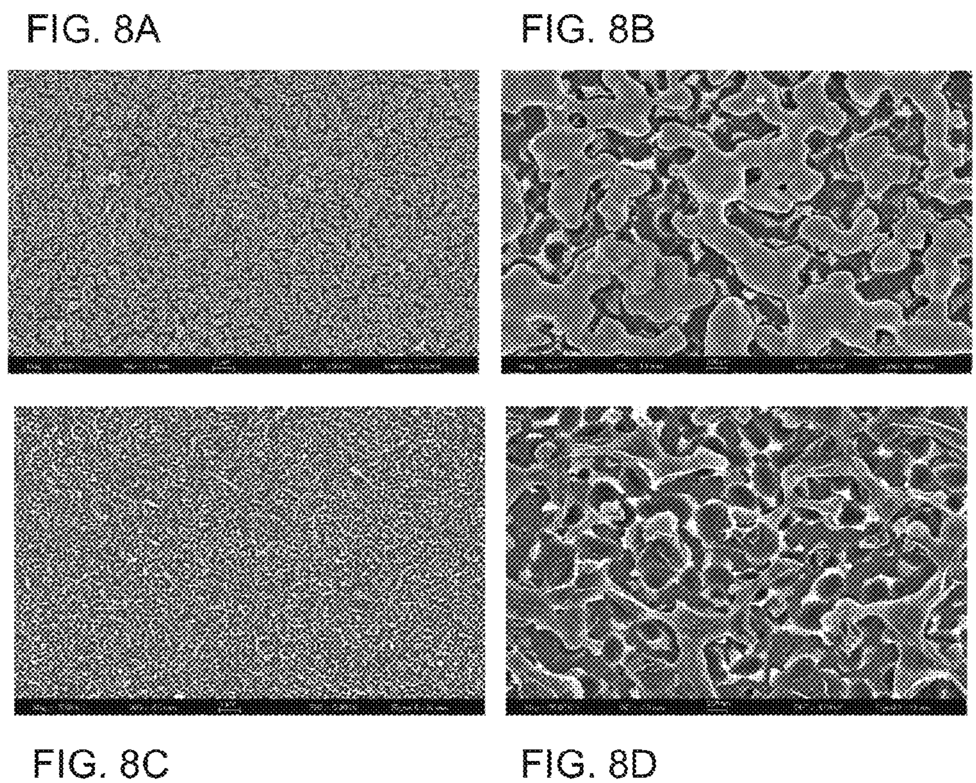
FIGS. 8A-8D present SEM images of deposited copper nanoparticles in porous fused $SiO_2$ at 5,000× (FIG. 8A) and 25,000× magnification (FIG. 8B), and graphene structures at 5,000× (FIG. 8C) and 25,000× magnification (FIG. 8D), grown via CVD at 900° C. for 30 minutes.

Copper particles are embedded in porous fused silica and subsequently, pure $C_2H_2$ at 0.1-0.5 Torr is used as carbon source for growing graphene via CVD. FIGS. 8A-8B show SEM images of the embedded copper particles in fused silica. Multilayer spherical balls of graphene are obtained when the Cu/$SiO_2$ substrate is heated to 900° C. (FIGS. 8C-8D).

Example 4

Figures 9A, 9B:
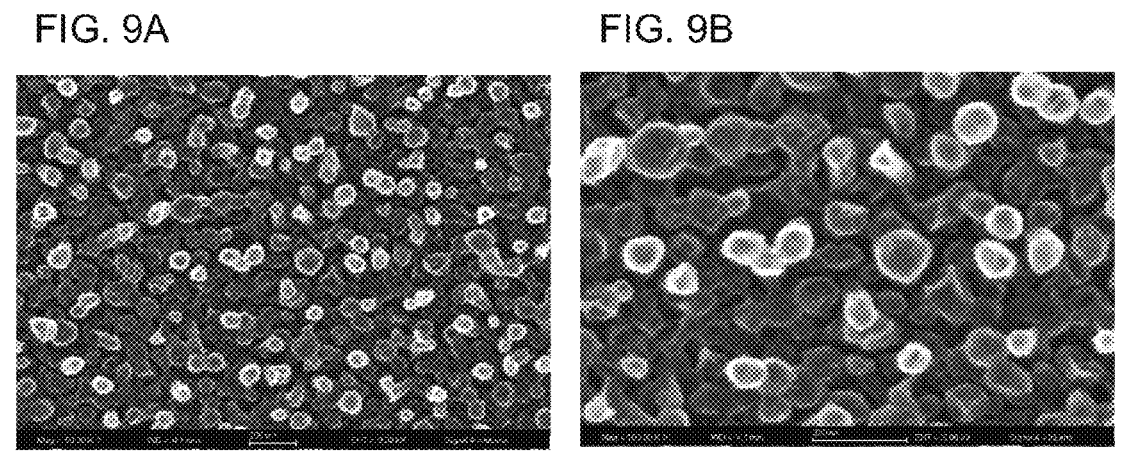

Multi-layer hollow graphene spheres are made by CVD coating graphene at 900° C. onto a multilayer copper support with the copper support not vaporizing. The sample is then heated to 1000° C. to evaporate the copper support (FIG. 9). The lighter colored spheres in FIG. 9 are on top of darker spheres.

What is claimed is:

1. A method of forming an article, the method comprising:

(a) depositing a metal from a source onto a surface of a substrate to form a metallic layer comprising metal structures; and (b) forming a porous, three-dimensional construction having an average surface area from about 200 $m^2$/g to about 2200 $m^2$/g, a porosity of from about 90% to about 99.6%, and with at least one three-dimensional graphene structure having at least a partially hollow core via chemical vapor deposition of a graphene layer on the metallic layer using a carbon-source gas, wherein: i) the at least one three-dimensional graphene structure comprises five or less layers of graphene; and ii) the at least one three-dimensional graphene structure has an average diameter from about 30 nm to about 500 nm, the at least partially hollow core formed by at least one of at least partially removing one of the metal structures by thermal or chemical processes or using a nanoshell.

2. The method of claim 1, wherein the metal comprises a transition metal and the chemical vapor deposition occurs at a temperature from about 200° C. to about 800° C.

3. The method of claim 1, wherein the metal structures comprise at least one of copper, cobalt, nickel, iron, zinc, silver, or gold particles.

4. The method of claim 3, wherein the particles are nanoparticles having a diameter along a longest axis from about 5 nm to about 500 nm.

5. The method of claim 1, wherein the carbon-source gas is chosen from $CH_4$, $C_2H_2$, $CF_4$, $CHF_3$, $C_2F_6$, $C_2H_6$, $C_3H_8$, $C_3H_6$, $C_6H_{14}$, $C_6H_6$, $C_6H_5CH_3$, and combinations thereof.

6. The method of claim 5, wherein the carbon-source gas has a pressure of from about $1\times10^{-4}$ to 100 Torr and the chemical vapor deposition is performed at a temperature greater than 600° C.

7. The method of claim 1, further comprising removing the metallic layer by heating a graphene coated metallic layer to a temperature sufficient to vaporize the metallic layer.

8. The method of claim 1, further comprising removing the metallic layer chemically by soaking a graphene coated metallic layer in a chemical that removes the metallic layer.

9. The method of claim 8, wherein the chemical comprises ammonium persulfate, iron chloride, iron nitrate, copper chloride, hydrochloric acid, nitric acid, sulphuric acid, hydrogen peroxide, and combinations thereof.

10. The method of claim 1, wherein:

the at least one three-dimensional graphene structure comprises a plurality of three-dimensional graphene structures, the substrate has a surface roughness (Ra) of 2 nm or less; and a coating layer forming the porous, three-dimensional construction has a thickness from about 500 nm to about 800 μm.

11. The method of claim 10, wherein:

the substrate is transparent; and adhesion of the coating layer to the substrate exhibits an effective adhesion energy at an interface of the coating layer and the substrate of from about 0.1 J/$m^2$ to about 4 J/$m^2$.

12. The method of claim 1, further comprising substantially completely removing the metallic layer by a thermal or chemical process to create a three-dimensional hollow graphene structure.

13. The method of claim 1, further comprising partially removing the metallic layer by a thermal or chemical process to create a three-dimensional graphene structure with the metal as a core.

14. The method of claim 1, further comprising partially removing the metallic layer by a thermal or chemical process and subsequently modifying remaining metal to create a three-dimensional graphene structure with the modified remaining metal as a core.

15. The method of claim 14, wherein the metal comprises gold and the modified remaining metal is chemically modified with thiols.

16. The method of claim 14, wherein the metal comprises copper and the modified remaining metal is chemically modified to form $Cu_2O$.

17. The method of claim 1, wherein hydrogen gas is used during the chemical vapor deposition.

18. The method of claim 1, further comprising thermal processing the graphene layer on the metallic layer after the chemical vapor deposition to form the porous, three-dimensional construction.

19. The method of claim 1, wherein the chemical vapor deposition is performed at a temperature to form the porous, three-dimensional construction without thermal processing the graphene layer on the metallic layer after the chemical vapor deposition.

20. The method of claim 1, further comprising applying a layer of polymer on the metallic layer to form a metal/polymer composite film prior to the chemical vapor deposition.

21. The method of claim 1, wherein the metal is deposited via metal vapor deposition to deposit spherical metal structures on the substrate.

22. The method of claim 1, wherein the metal is deposited using a slurry containing a metal powder in a polymer binder and heating the metallic layer to remove the polymer binder.

23. The method of claim 22, wherein the metal is deposited using multiple coatings to reach a desired thickness.

24. The method of claim 1, further comprising incorporating an additional discrete element into the porous, three-dimensional construction at least one of:

between the substrate and the at least one three-dimensional graphene structure, between the at least one three-dimensional graphene structure and subsequent layers opposite the substrate, or integrated or on the at least one three-dimensional graphene structure.

25. The method of claim 1, further comprising incorporating an additional continuous element into the porous, three-dimensional construction at least one of:

between the substrate and the at least one three-dimensional graphene structure, between the at least one three-dimensional graphene structure and subsequent layers opposite the substrate, or integrated or on the at least one three-dimensional graphene structure.

26. A method of forming an article, the method comprising:

(a) depositing a metal from a source onto a surface of a substrate to form a metallic layer comprising metal structures; and (b) forming a porous, three-dimensional construction having an average surface area from about 200 $m^2/g$ to about 2200 $m^2/g$ and with at least one three-dimensional graphene structure having at least a partially hollow core via chemical vapor deposition of a graphene layer on the metallic layer using a carbon-source gas, wherein:

the at least one three-dimensional graphene structure comprises five or less layers of graphene, the at least one three-dimensional graphene structure has an average diameter from about 30 nm to about 500 nm, and for each three-dimensional graphene structure, the at least partially hollow core of the three-dimensional graphene structure is formed by partially removing one of the metal structures by thermal or chemical processes and subsequently modifying remaining metal to create a core of the three-dimensional graphene structure.

27. The method of claim 26, wherein the metal comprises gold and the modified remaining metal is chemically modified with thiols.

28. The method of claim 26, wherein the metal comprises copper and the modified remaining metal is chemically modified to form $Cu_2O$.

29. A method of forming an article, the method comprising:

(a) depositing a metal from a source onto a surface of a substrate to form a metallic layer comprising metal structures; and (b) forming a porous, three-dimensional construction having an average surface area from about 200 $m^2/g$ to about 2200 $m^2/g$ and with at least one three-dimensional graphene structure having at least a partially hollow core via chemical vapor deposition of a graphene layer on the metallic layer using a carbon-source gas, wherein: i) the at least one three-dimensional graphene structure comprises five or less layers of graphene; and ii) the at least one three-dimensional graphene structure has an average diameter from about 30 nm to about 500 nm, the at least partially hollow core formed using a nanoshell.

* * * * *